US009552150B2

(12) United States Patent
Schaller et al.

(10) Patent No.: US 9,552,150 B2
(45) Date of Patent: Jan. 24, 2017

(54) SCROLL BAR CONTROL

(75) Inventors: Rebecca Jo Schaller, Hampshire (GB); Joseph Robert Winchester, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1624 days.

(21) Appl. No.: 12/195,498

(22) Filed: Aug. 21, 2008

(65) Prior Publication Data

US 2009/0070707 A1 Mar. 12, 2009

(30) Foreign Application Priority Data

Sep. 7, 2007 (EP) ...................................... 07115946

(51) Int. Cl.
*G06F 3/048* (2013.01)
*G06F 3/0485* (2013.01)

(52) U.S. Cl.
CPC ......... *G06F 3/04855* (2013.01); *G06F 3/0485* (2013.01)

(58) Field of Classification Search
CPC .................................................... G06F 3/0485
USPC ................................ 715/833, 786, 787, 785
See application file for complete search history.

(56) References Cited

U.S. PATENT DOCUMENTS

| | | | |
|---|---|---|---|
| 4,831,556 A * | 5/1989 | Oono | 715/786 |
| 6,204,846 B1 * | 3/2001 | Little et al. | 715/784 |
| 6,373,584 B1 * | 4/2002 | Barney et al. | 358/1.15 |
| 7,877,708 B2 * | 1/2011 | Zinn et al. | 715/864 |
| 2002/0057272 A1 | 5/2002 | Hamada | |
| 2004/0014013 A1 | 1/2004 | Diesel et al. | |
| 2004/0119753 A1 | 6/2004 | Zencke | |

(Continued)

FOREIGN PATENT DOCUMENTS

| | | |
|---|---|---|
| CN | 1346457 A | 4/2002 |
| JP | 07-273992 A | 8/1996 |

(Continued)

OTHER PUBLICATIONS

Anonymous: "Audio Player Wordpress Plugin," 1 Pixel Out (Online), 4, Sep. 2006, Retrieved from Internet: http://www.1pixelout.net/code/audio-player-wordpress-plugin/cp=all, paragraph "Colour scheme" (figure)—paragraph "Runtime options."

(Continued)

*Primary Examiner* — Ajay Bhatia
*Assistant Examiner* — Phuong Nguyen
(74) *Attorney, Agent, or Firm* — Lee Law, PLLC; Christopher B. Lee

(57) ABSTRACT

A user interface control for scrolling a display of computer program data during retrieval of computer program data includes a track, a bar overlying the track, and a thumb button movable along the bar to scroll the displayed data. The size of the track indicates the total amount of data being retrieved, and the size of the bar varies to indicate the progress of the data retrieval. Thus, the ratio of the size of the bar to that of the track indicates the ratio of available to total data. The computer program data is displayed in a display area allocated to the computer program, and the size of the thumb button (compared to a corresponding size of the track) indicates the ratio of the amount of data displayed in the display area to the total amount of data being retrieved.

14 Claims, 7 Drawing Sheets

(56) References Cited

U.S. PATENT DOCUMENTS

| | | |
|---|---|---|
| 2007/0157112 A1* | 7/2007 | Peters ............................ 715/786 |
| 2008/0165141 A1* | 7/2008 | Christie ........................ 345/173 |
| 2009/0024923 A1* | 1/2009 | Hartwig et al. .............. 715/716 |

FOREIGN PATENT DOCUMENTS

| | | |
|---|---|---|
| JP | 09-275749 A | 4/1999 |
| JP | 12-182319 A | 12/2001 |
| JP | 12-347286 A | 5/2002 |
| JP | 11-600169 A | 11/2002 |
| JP | 14-054450 A | 9/2003 |
| JP | 14-139310 A | 11/2003 |
| JP | 15-288664 A | 3/2005 |
| JP | 15-395897 A | 6/2005 |
| JP | 16-377759 A | 7/2006 |
| JP | 17-167568 A | 12/2006 |
| JP | 17-196540 A | 1/2007 |
| JP | 20-530725 A | 4/2008 |
| WO | 02065279 A2 | 8/2002 |
| WO | 2007037237 A1 | 4/2007 |

OTHER PUBLICATIONS

Charles Petzold, Programming Windows—Fifth Edition, Book, Jan. 1, 1999, pp. 108-109, Microsoft Press, Redmond, WA.

Author Unknown, Zoom-Scale Using Conventional Scroll Bars, IBM Technical Disclosure Bulletin, Aug. 1, 1996, pp. 151-152, vol. 39, No. 8, International Business Machines Corporation, U.S.A.

European Patent Office, Examination Report for Application No. EP08786960.8, Jul. 26, 2011, pp. 1-6, Berlin, Germany.

Author Unknown, Office Action for Chinese Counterpart Application No. 200880105767.3, Jun. 24, 2011, pp. 1-6, State Intellectual Property Office of the People's Republic of China (English translation not available).

* cited by examiner

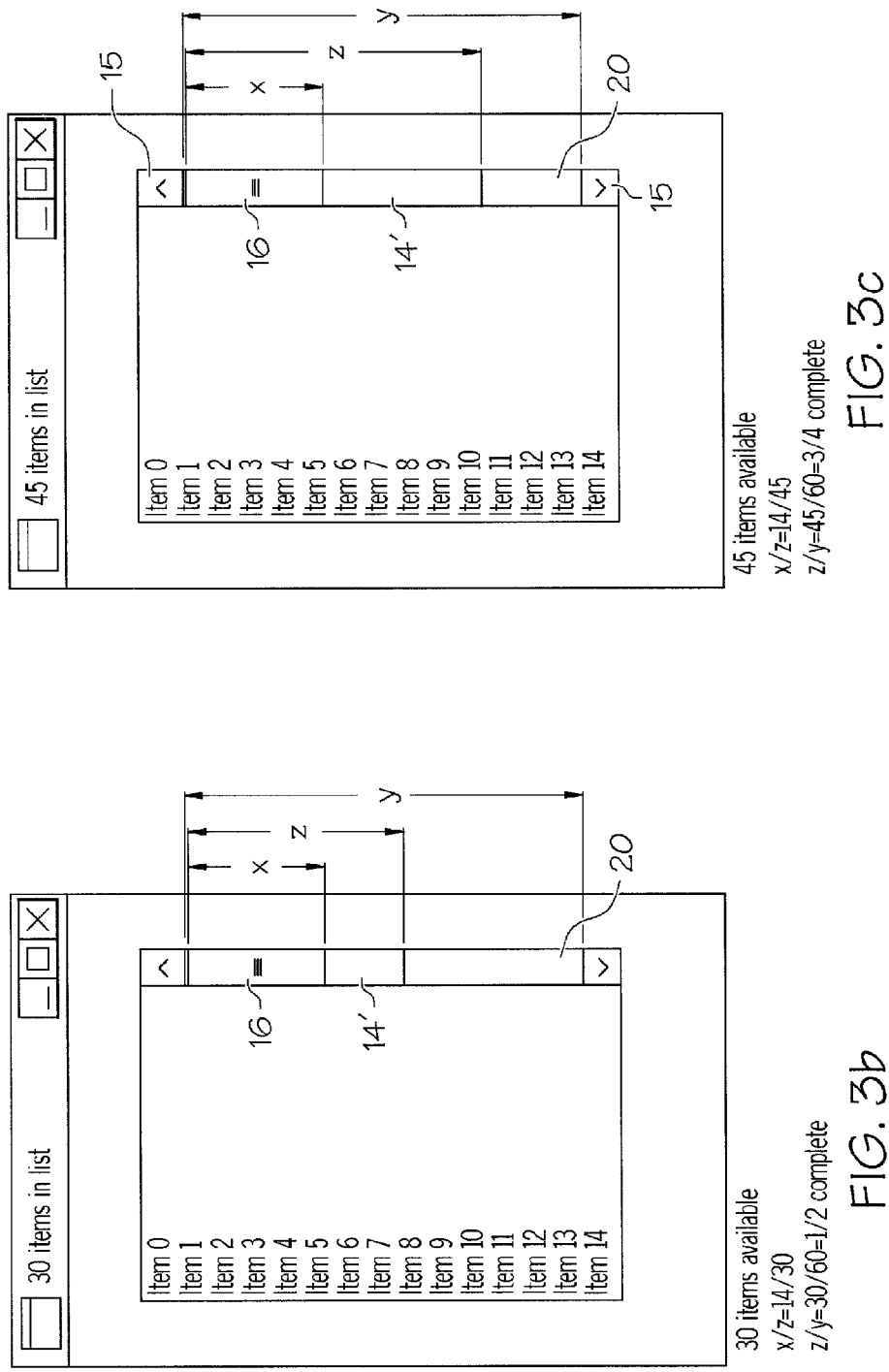

SCROLL BAR CONTROL

FIELD OF THE INVENTION

The present invention relates to the field of user interface controls and in particular to a scroll bar.

BACKGROUND

A User Interface (UI) allows users of a computer system to interact with a computer application program, by using graphical elements to represent the application information and actions available to a user. The actions are usually performed through direct manipulation by a user of displayed graphical elements called controls, or widgets.

A computer application is often allocated an area of a display screen in which it can display all or part of the application's presentation content, such as a web page, email message, or drawing, for example. When the dimensions of the application presentation space are larger in the horizontal and/or vertical direction than those of the on-screen viewing area assigned to the application, a scroll bar is displayed. The scroll bar provides a mechanism whereby the visible portion of the presentation space can be selected.

The viewing area is often provided within a view window, which provides a frame or container for the main presentation content, and which can be resized, moved, hidden, restored, and closed as desired. The scroll bar is used to manipulate the region of the presentation space which is visible through the view window and also to indicate the location of the data displayed in the window relative to the whole presentation space.

A cursor control device, such as a mouse or trackball device, can be used to control the scroll bar. As shown in FIGS. 1a and 1b, a scroll bar control 10 is usually designed as a longitudinal bar 14 along on one or two sides of a view window 18, each containing a thumb button 16. Typically, a user can manipulate the displayed view by dragging the thumb button to some position in the scroll bar control. Alternatively, the user scrolls up/down a view incrementally in units of a row/column or in larger units, such as page size or the horizontal/vertical view dimension, by clicking on the bar on either side of the thumb. A scroll bar control typically also includes scroll buttons 15 at each end of the scroll bar, which allow a user to scroll up/down or left/right (by units using single mouse clicks or continuously by holding down the scroll button) through the presentation space. This provides a rapid and efficient method for the user to vertically and/or horizontally scroll the window through the presentation space.

In the case of a horizontal scroll bar control, the thumb button can be moved horizontally between a left bound (conventionally, the minimum position) and a right bound (conventionally, the maximum position). Similarly, in the case of a vertical scroll bar control, the thumb button can move vertically between a lower bound (conventionally the bottom or minimum position) and an upper bound (conventionally the top-most or maximum position).

In modern scrollbars, the size of the thumb button often indicates a ratio of the size of the visible display area (or amount of visible data) to the size of the application presentation space (or amount of total available data), and the position of the thumb button along the scrollbar indicates the location of the area of the presentation space (or portion of the data) which is being displayed.

For example, suppose a UI is being used to present a list of thirty data items to a user, but there is only enough on-screen space to list fourteen of these. FIG. 1a shows how the ratio of visible to available data is typically conveyed to the user as a ratio of the thumb button size (x) to the total bar length (y). So, in FIG. 1a, x/y=14/30.

FIG. 1b shows how the items displayed in the window change when the thumb button is moved. The top edge of the thumb button 16 has been moved a distance a from the top of the scrollbar. In FIG. 1b the top of the thumb button is now 1/3 of the way along the scrollbar length, that is a/y=1/3, so the topmost item in the view is item 30/3=10. The size (x) of the button 16 remains unaltered being a ratio of 14/30 of the bar length because the amount of available data remains the same as in FIG. 1a.

A problem is encountered in the scenario where the user interface is being used to control data that is being populated asynchronously and the application makes the data available for display as it is received, that is before the full set of data has been retrieved. This occurs in situations where there is delay in the data being made available, such as displaying a set of data from a server where retrieval over a network has some kind of latency, where the data becomes available in discrete portions, such as files or pages, or any kind of processing where a significant time is taken between data items being added to the available data set. In such scenarios, rather than wait until all of the items are known before making the list available to the user, there is a benefit in showing the user the available data, and updating the display as updates are received. This has the advantage that the user can begin working with data items as they become individually available allowing them to continue working as the program asynchronously adds more items. However, because the size of available data, such as number of rows, is increasing over time this has the consequence that the size of the scrollbar thumb button decreases to reflect the new ratio of visible items/available items, and also that if the thumb button is not at the top of the scrollbar, the thumb button may also move upwards as the relative location of the visible data also changes.

This is illustrated in FIGS. 2a, 2b and 2c which show the progression over time of the display of a list of items, first with 15 available items, then 30, and finally 45. In each situation the thumb button size is different because the number of available items (rows) has changed. When there are 15 items in the list (FIG. 2a) the ratio x/y=14/15, and then later 30 items (FIG. 2b) the ratio x/y=14/30. FIG. 2c shows that as time continues to progress, the thumb button size continues to shrink, and with 45 items in total the ratio x/y is just 14/45. This situation makes the list difficult to operate for the user. If the list is in the state shown in FIG. 2a and the user selects the thumb button ready to move it and scroll the list, because the thumb button is dynamically decreasing in size as the application is adding more rows, the thumb button is a moving target. Also as more rows are added the relative locations of the displayed data items to others in the list changes. This may lead to the thumb button moving along the scrollbar, as well as changing in size. Furthermore, when the user wishes to scroll to a different view, the user is unable to determine the position to which the thumb button should be moved in order to make visible the required portion of the data as the relative locations represented by positions along the scroll bar keep changing.

Another problem is that the user has no way of knowing when the list is complete because the application is adding items in the background. Prior art methods for overcoming this problem add another kind of indicator to the UI, an animated graphic, such as a progress bar, whose state changes to show that activity is occurring, and which is found in web browsers, busy cursors, and so forth. These have the disadvantage of being somewhere else on the UI, so they are not directly in front of the user looking at and working with the list, and can be confusing for a user if there are two or more view windows, each requiring a progress indicator. A solution in some applications is not to show the user the partially available list items and wait until the entire retrieval task is complete, however this suffers from poor usability because it prevents the user from starting working with the items as they become available and slows down perceived response time as the user has to wait for longer periods before being able to see and work with data.

SUMMARY

A first aspect of the invention provides a user interface control for scrolling a display of computer program data during retrieval of computer program data; the control comprising a track, an extendable bar overlying the track, and a thumb button movable along the bar to scroll the displayed data; wherein the size of the track is indicative of the total amount of data being retrieved; and the size of the bar varies to indicate the progress of the data retrieval. Thus, the ratio of the size of the bar to that of the track indicates the ratio of available to total data.

In a preferred embodiment, the computer program data is displayed in a display area allocated to the computer program, and the size of the thumb button is fixed. Preferably, the size of the thumb button (compared to a corresponding size of the track) indicates the ratio of the amount of data displayed in the display area to the total amount of data being retrieved. This has the further advantage that the scrollbar thumb button does not change size over time nor move without user input, making it easier for a user to interact with the scroll bar control.

Another aspect of the invention provides a method of providing a user interface control for scrolling a display of computer program data during retrieval of data by the computer program. The method comprises receiving a portion of the computer program data, and displaying some or all of the received data in a display area assigned to the computer program. The method also comprises providing within the display area one or more scroll bar control(s), each comprising a track, an extendable bar overlying said track, and a thumb button movable along the bar to scroll the displayed data, wherein the size of the track is indicative of the total amount of computer program data being retrieved, and the size of the bar varies to indicate the progress of the data retrieval.

A further aspect of the invention provides a system for displaying computer program data during retrieval of data by the computer program. The system comprises a window manager for managing one or more view windows on a computer display and a scroll bar manager for controlling one or more scroll bar control(s). Each scroll bar control comprises a track, an extendable bar overlying the track, and a thumb button movable along the bar to scroll the displayed data; wherein a size of the track is indicative of the total amount of data being retrieved; and a size of the bar varies to indicate the progress of the data retrieval.

BRIEF DESCRIPTION OF THE DRAWINGS

Preferred embodiments of the present invention will now be described by way of example only, with reference to the accompanying drawings in which:

FIGS. 2a, 2b and 2c show a series of view windows displaying data from a set of data which is being retrieved and a prior art scroll bar;

FIGS. 3a, 3b and 3c show a series of view windows with a scroll bar according to an embodiment of the present invention;

DETAILED DESCRIPTION

The present invention provides a progress indicator by varying the size of a bar, along which a thumb button is movable to scroll the displayed data, to indicate the ratio of available to total data.

Figures 2C, 3A:
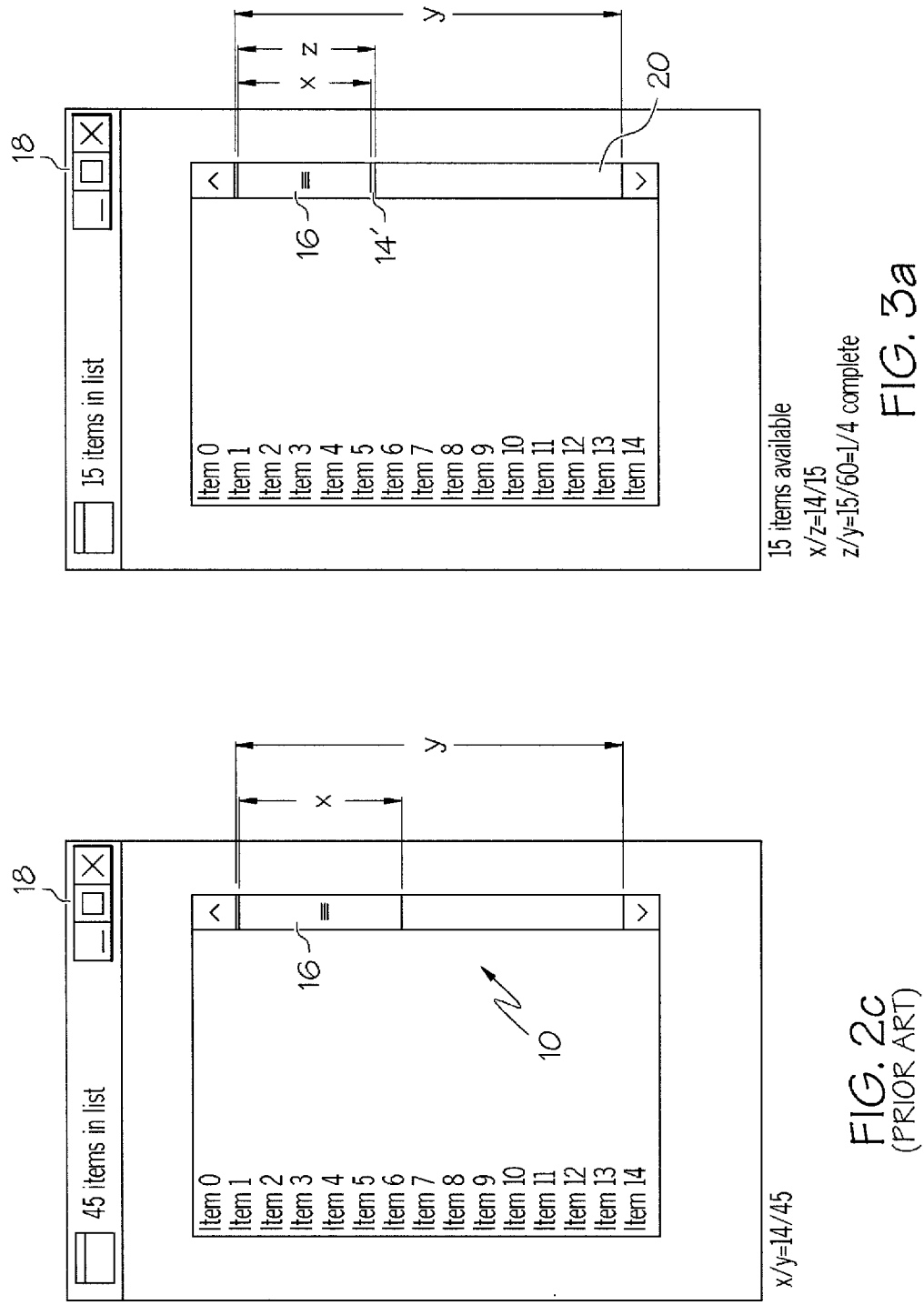

FIGS. 3a, 3b and 3c show the use of such a modified scrollbar control, which comprises an extendable bar 14' and a thumb button 16 movable along the bar to scroll the displayed data. The size of the scroll bar 14' varies according to the amount of data which has already been retrieved and thus indicates the progress of the data retrieval. The bar extends to fill a track 20, the extent of which indicates the final extent of the scrollbar once all the data has been retrieved. The size of the thumb button indicates the ratio of the amount of data which is displayed in the view window to the total amount of data being retrieved.

Advantages of the invention may be realized in situations where two factors occur. The first is latency in an application determining the full set of data to display which becomes available in portions. The second is that the application can calculate the total size of the data that it expects to display. This value allows the scrollbar size to be varied as a ratio of number of available rows to total number of rows at completion.

For example, in an application displaying a list of items which are currently being downloaded, there may be significant work involved in determining the data items to add to the list. The user of the application would benefit from being shown data items as they become available, in order to be able to work with available items whilst other items are still being retrieved. If the application can calculate the total number of data items that it expects to list, or rows that it expects to create, the scrollbar size can be varied to indicate the ratio of number of available rows to total number of rows at completion.

One example of a situation in which this occurs is downloading documents across a latency bound connection, such as FTP, through a web browser application. Here the total file size can be determined up front and as pages become available they are shown to the user. The scrollbar can give them feedback of where they can position the viewable window in the available pages that have been downloaded, together with the current progress towards complete download of the full document.

Another situation in which both of these occur is in an application that is retrieving rows from a database using structured query language (SQL). Here there is latency involved in iterating the result set from the query. The total number of rows can be determined by doing a SELECT COUNT(*) query.

Figure 1B:
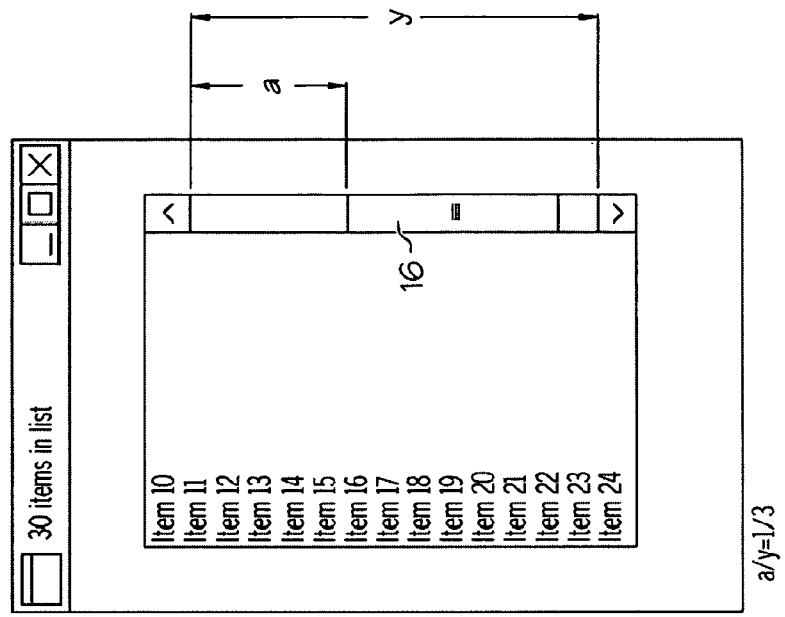
FIGS. 1a and 1b show a prior art scrollbar in a view window showing data from a user application in which the total data is available.
Figure 1A:
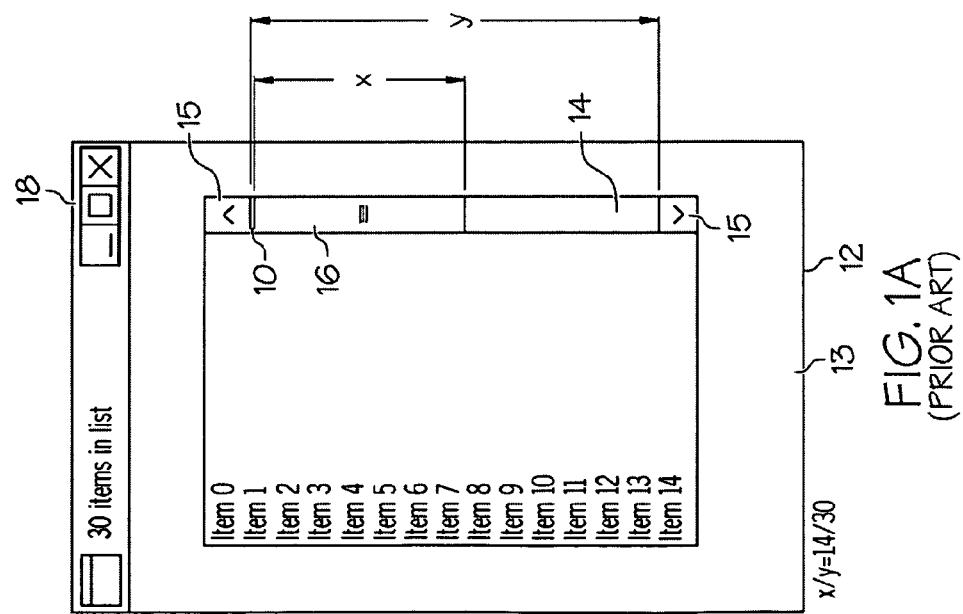
Figure 2B:
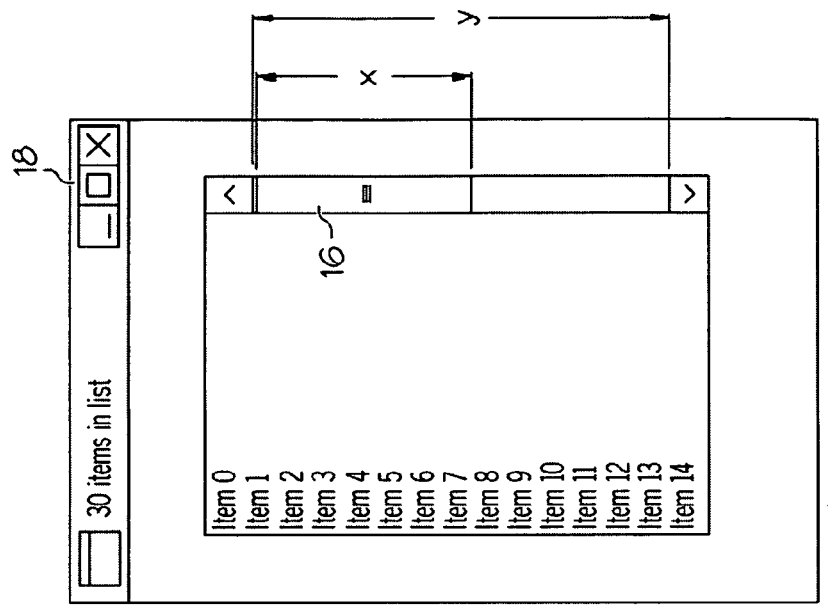
Figure 2A:
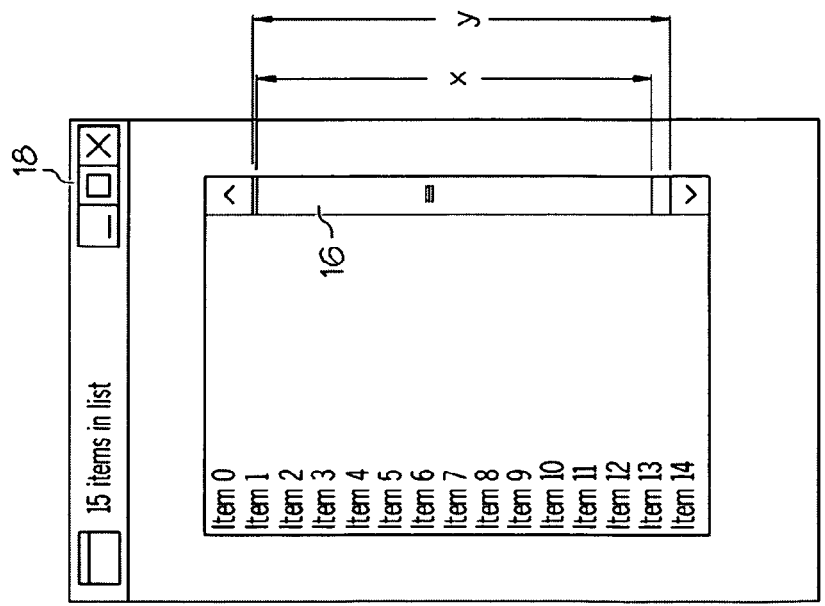
Figure 4:
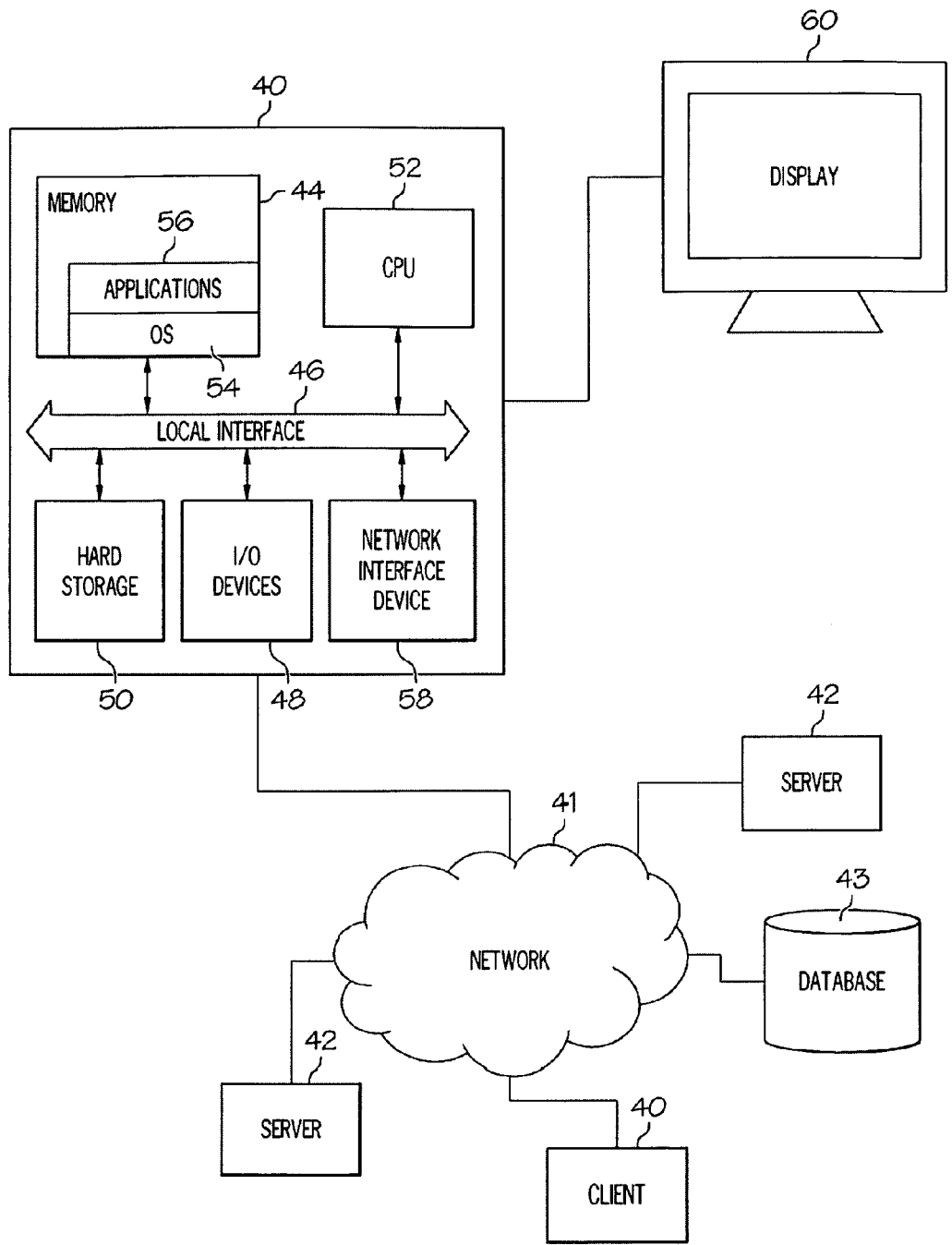
FIG. 4 shows a schematic representation of a network of data processing systems according to an embodiment of the present invention.

Referring to FIG. 4, there is illustrated a simplified representation of a computer network 41, such as the Internet, connecting a plurality of data processing systems. Shown in FIG. 4, network 41 is connected to one or more servers 42, clients 40, and databases 43. FIG. 1 shows a simplified representation of the typical components of such a data processing system 40, which include a processor (CPU) 52, and memory 44 coupled to a local interface 46. One or more user input devices 48 are connected to the local interface 46. Additionally, hard storage 50 and a network interface device 58 are provided.

The processor 52 may be a hardware device for executing software located in memory 44, and may be any custom made or commercially available processor, a central processing unit (CPU), a semiconductor based microprocessor, a macro processor, or generally any device for executing software instructions.

Memory 44 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM etc.). Memory 44 may incorporate electronic, magnetic, optical, and/or other types of storage media. Memory 44 may also have a distributed architecture, with various components being situated remote from one another, but being accessible by the processor 52.

Local interface 46 may be, for example, one or more buses or other wired or wireless connections and may comprise additional elements which are omitted for simplicity, such as controllers, buffers (caches), drivers, repeaters, and receivers. Further, local interface 46 may include address, control, and/or data connections to enable appropriate communications among components of the data processing system 40.

Input/output (I/O) devices 48 may comprise any device configured to communicate with local interface 46, such as a keyboard, cursor control device and display device 60. Additional input/output devices such as optical drives, floppy disk drives, cameras, I/O ports, printers, speakers, microphones, scanners, etc. could also be provided.

The data processing systems 40, 42 may comprise, for example, personal computers (PCs), laptops, servers, workstations, or portable computing devices, such as personal digital assistants (PDAs), mobile telephones or the like. Furthermore, data processing systems 40, 42 may comprise additional components not illustrated in FIG. 4, and, in other embodiments, may not include all of the components illustrated in FIG. 4.

Network interface device 58 may be any device configured to interface between the data processing system 40 and a computer or telecommunications network 41. Network 41 may be a Local Area Network (LAN), a private computer network, a telecommunications network, such as a public or private packet-switched, or other data network including the Internet, a circuit switched network, or a wireless network.

A computer program for implementing various functions or for conveying information may be supplied on carrier media such as one or more DVD/CD-ROM, and/or floppy disk, and/or USB memory device, and then stored on a hard disk, for example.

Illustrated in FIG. 4, within memory 44 are operating system (OS) 54 and applications 56. Applications 56 refer to processes being currently run on the data processing system 40. The OS is a software (or firmware) component of the data processing system 40 which provides an environment for the execution of programs by providing specific services to the programs including loading the programs into memory and running the programs. The OS also manages the sharing of internal memory among multiple applications and/or processes and handles input and output control, file and data management, communication control and related services. Application programs make requests for services to the OS through an application program interface (not shown).

Applications 56 may include one or more applications which are displaying data to a user on display device 60 via a user interface. A cursor control device, such as a mouse, trackball, set of keyboard navigation keys (e.g., arrow keys), touchpad, joystick or touch sensitive screen, configured to cooperate with an application 56 and/or OS 54 can be used to provide user inputs and to manipulate one or more cursor(s) displayed on the display device 60. Moreover, such a device can be used to interact with one or more user interface widgets, for example to drag a scrollbar thumb.

Figure 5:
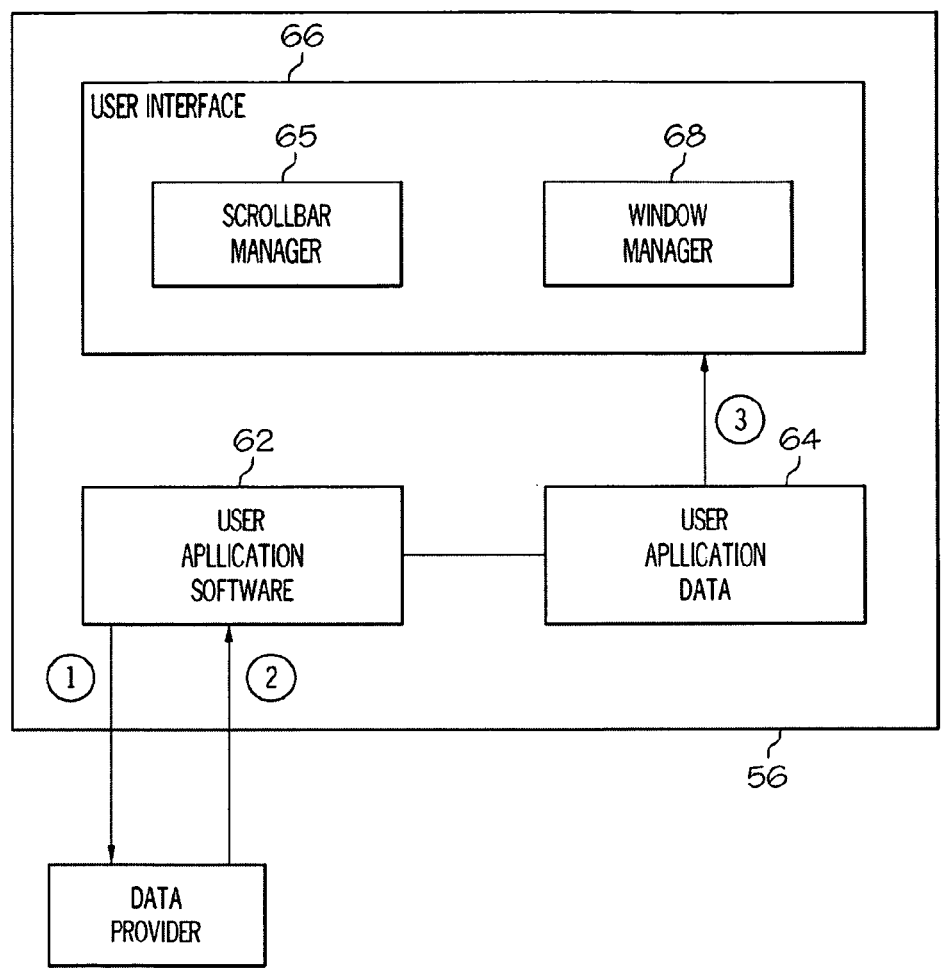
FIG. 5 shows the components of a user application displaying application data according to an embodiment of the present invention.

FIG. 5 shows the organization within memory 44 of components of a user application 56 which is displaying user application data 64 within a view window on display device 60. The user interface 66 includes a window manager 68, which controls one or more view windows on the display, in which the user application data may be displayed, and a scrollbar manager 65, which manages one or more scrollbar control(s) which may be displayed within each view window and which may be manipulated by a user in order to scroll the display within the respective view window. The scrollbar manager stores data, which may for example include thumb button location, thumb button size and bar size, for each scrollbar control.

The user application is able to retrieve data from another location, such as from a server or from a database, which may be coupled directly to the data processing system 40 or indirectly via a network. In some instances, such as when the user application 62 requests a particular data file, such as a document, the application may already be aware of the size of the requested file. In other instances, a server or database sending data to the application should send, for example in the message header, an indication of the total size of the data which is being sent to the application. The user application stores the application data as it receives it and asynchronously displays all or part of the received data in the view window.

When required, the user interface also displays within the view window a scroll bar control, comprising an elongate track, an extendable bar overlying the track, and a thumb button movable along the bar to scroll the displayed data. The size of the track is indicative of the total amount of data being retrieved, and by comparison the size of the thumb button is indicative of the size of the portion which is viewable in the view window. The size of the scroll bar varies according to the amount of data which has already been retrieved and thus indicates the progress of the data retrieval.

Figure 6:
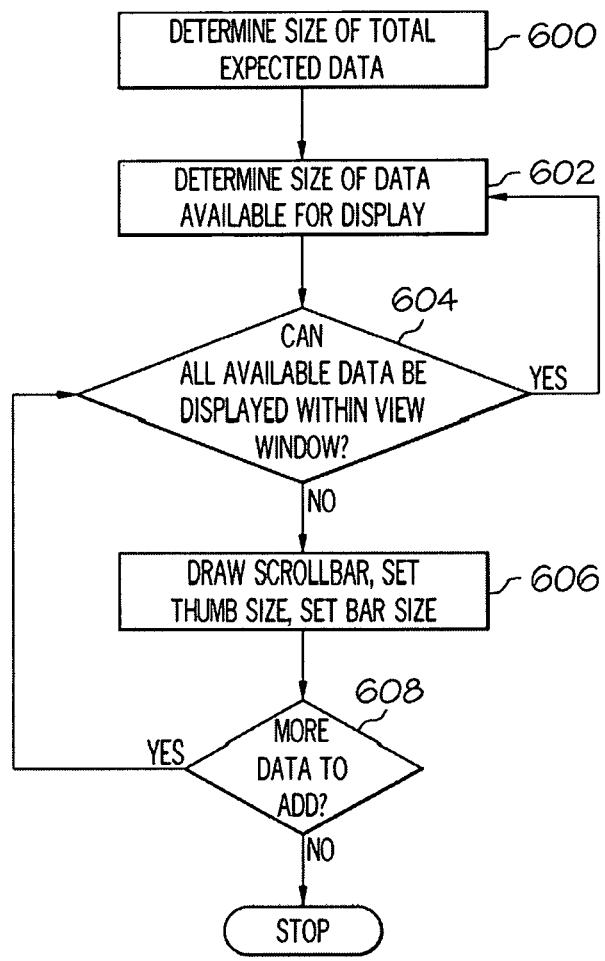
FIG. 6 shows a flow diagram of the steps involved in a method according to an embodiment of the present invention.

FIG. 6 shows a flowchart of the steps involved in displaying the scrollbar control when the user application is retrieving a set of data in discrete portions and making the data available for display asynchronously, that is, as it is received, rather than only once the full set of data has been retrieved. At the beginning of the data retrieval process the user application 56 determines (step 600) the total amount of data to be retrieved. The data retrieval process may be initiated by a request (1) from the user application for a particular set of data, and this request may include a query as to the size of the requested data set. The first portion of data received by way of response (2) may then indicate the total size of the data requested. When a first portion of requested data is received by the user application software it is passed (3) to the user interface component for display to the user. This component determines (step 602) the display dimensions required to view the received portion of data. Next, the user interface component compares (step 604) these display dimensions with the dimensions of the view window allocated to the application to determine whether all of the available data can be displayed within the view window. If the dimensions of the view window are greater than those required to view the received data then no scrollbar control is required in the view window and the method returns to step 602 and waits for the arrival of a next portion of data. If the view window dimensions are not sufficient, then the process moves to step 606 in which the scrollbar manager draws one or more scrollbar control(s). For each scrollbar control the scrollbar manager sets the length z of the bar (14') (compared to the lengthy of the track (20)) according to the ratio of the display size of the available total to the display size of the amount of data requested; and sets the length x of the thumb button (16) (compared to the length y of the track) according to the ratio of the amount of data visible in the view window compared to the total amount of data being retrieved. In step 608 if the application software receives more data to be added to the display, the method returns to step 604, and then redraws the view window and/or scrollbar control accordingly.

By way of example, FIGS. 3a, 3b and 3c display a series of view windows that might be displayed by a user application which is retrieving rows from a database using structured query language (SQL). The application can determine the total number of rows which will result from a particular database query by using the SELECT(COUNT) function. In this example, a total of 60 rows will be listed when all the results of the query have been received. In FIG. 3a only 15 rows have so far been added to the list so the length z of the scroll bar (14') is 15/60=1/4 of the length y of the track (20). The length x of the thumb button (16) however is set as though all 60 rows were available. Over time, as more rows become available, the only size that varies is the length of the scroll bar, z. The ratio of z/y shows the progress to completion and the ratio of x/z allows the user to move the thumb button and vary which of the available rows are shown in the window.

FIG. 3b shows a screen shot taken at a later time when the application has added another 15 items. The thumb button size has not changed but the length of the scrollbar has increased: x/z=14/30; z/y=30/60=1/2 complete.

As shown in FIG. 3c, at a still later time when 15 further items have been added, the thumb button size has still not changed in size, and the scrollbar size has further increased: x/z=14/45; z/y=45/60=3/4 complete.

The size of the scroll bar (14') will continue to increase until all the data has been retrieved and the scroll bar takes up the full length of the track (20), which is then no longer visible. In a preferred embodiment, the track is an inactive user interface element, such that a user input/mouse click positioned over the track has no effect, so to scroll the view a user must interact with the overlying bar. However, in other embodiments the track may provide further functionality.

An advantage of this technique may be that the user can see the progress towards completion of all list data being available by the size of the scrollbar, i.e. the ratio of x/z in FIGS. 3a, 3b and 3c. Also, the scrollbar thumb button size does not change over time making the list more usable as the button that the user must try to select with their mouse does not dynamically change size or move.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation.

Once taught the invention, it will be understood by those skilled in the art that, although the present invention has been described in relation to the preceding example embodiments, the invention is not limited thereto and that there are many possible variations and modifications which fall within the scope of the invention.

What is claimed is:

1. A user interface control for scrolling a display of computer program data during retrieval of the computer program data by a computer program, the user interface control comprising:
 a track;
 an extendable scrollbar overlying the track; and
 a thumb button overlying the extendable scrollbar and movable within a variable length of the extendable scrollbar along the extendable scrollbar to scroll retrieved computer program data within a display area allocated to the computer program; and
 where a length of the track is indicative of a total amount of the computer program data being retrieved, the variable length of the extendable scrollbar increases in length along the length of the track as the computer program data is retrieved to indicate progress of the retrieval of the total amount of the computer program data, and a length of the thumb button is fixed based upon the total amount of the computer program data to be retrieved and indicates a ratio of an amount of the computer program data displayed within the display area relative to the total amount of computer program data being retrieved.

2. The user interface control according to claim 1, where the user interface control is configured to:
 determine display dimensions of the received computer program data;
 compare the display dimensions of the received computer program data to corresponding dimensions of the display area allocated to the computer program; and
 display a scroll bar control if at least one of the display dimensions of the received computer program data is larger than a corresponding one of the corresponding dimensions of the allocated display area.

3. The user interface control according to claim 1, where the computer program data comprises a set of data and the user interface control is further configured to:
 request the set of data by the computer program; and determine a size of the requested set of data, where the size of the requested set of data comprises the total amount of the computer program data being retrieved.

4. The user interface control according to claim 3, where, in being configured to determine the size of the requested set of data, the user interface control is configured to:
   issue a structured query language (SQL) count query to a database;
   receive a number of rows of data available from the database in response to the SQL count query; and
   set the total amount of the computer program data being retrieved as the number of rows of data available from the database in response to the SQL count query.

5. A method of providing a user interface control for scrolling a display of computer program data during retrieval of the computer program data by a computer program, the method comprising:
   receiving a first portion of a total amount of the computer program data being retrieved;
   displaying the received first portion of the total amount of the computer program data in a display area allocated to the computer program; and
   providing within the display area at least one scroll bar control, each of the at least one scroll bar control comprising:
      a track;
      an extendable scrollbar overlying the track; and
      a thumb button overlying the extendable scrollbar and movable within a variable length of the extendable scrollbar along the extendable scrollbar to scroll retrieved computer program data within the display area allocated to the computer program; and
      where a length of the track is indicative of the total amount of the computer program data being retrieved, the variable length of the extendable scrollbar increases in length along the length of the track as the computer program data is retrieved to indicate progress of the retrieval of the total amount of the computer program data, and a length of the thumb button is fixed based upon the total amount of the computer program data to be retrieved and indicates a ratio of an amount of the computer program data displayed within the display area relative to the total amount of computer program data being retrieved.

6. The method according to claim 5, further comprising:
   determining display dimensions of the received computer program data;
   comparing the display dimensions of the received computer program data to corresponding dimensions of the display area allocated to the computer program; and
   displaying one of the at least one scroll bar control if at least one of the display dimensions of the received computer program data is larger than a corresponding one of the corresponding dimensions of the allocated display area.

7. The method according to claim 5, where the computer program data comprises a set of data, and further comprising:
   requesting the set of data by the computer program; and
   determining a size of the requested set of data, where the size of the requested set of data comprises the total amount of the computer program data being retrieved.

8. The method according to claim 7, where determining the size of the requested set of data comprises:
   issuing a structured query language (SQL) count query to a database;
   receiving a number of rows of data available from the database in response to the SQL count query; and
   setting the total amount of the computer program data being retrieved as the number of rows of data available from the database in response to the SQL count query.

9. The method according to claim 5, further comprising:
   receiving another portion of the total amount of the computer program data; and
   increasing the variable length of the extendable scrollbar to indicate an increased amount of the computer program data available for display.

10. A system for displaying computer program data during retrieval of the computer program data by a computer program, the system comprising:
    a window manager that manages at least one view window; and
    a scroll bar manager that controls at least one scroll bar control, each of the at least one scroll bar control comprising:
       a track;
       an extendable scrollbar overlying the track; and
       a thumb button overlying the extendable scrollbar and movable within a variable length of the extendable scrollbar along the extendable scrollbar to scroll retrieved computer program data within a display area allocated to the computer program; and
       where a length of the track is indicative of a total amount of the computer program data being retrieved, the variable length of the extendable scrollbar increases in length along the length of the track as the computer program data is retrieved to indicate progress of the retrieval of the total amount of the computer program data, and a length of the thumb button is fixed based upon the total amount of the computer program data to be retrieved and indicates a ratio of an amount of the computer program data displayed within the display area relative to the total amount of computer program data being retrieved.

11. The system according to claim 10, where the scroll bar manager further comprises a user interface control component configured to:
    determine display dimensions of the received computer program data;
    compare the display dimensions of the received computer program data to corresponding dimensions of the display area allocated to the computer program; and
    display one of the at least one scroll bar control if at least one of the display dimensions is larger than a corresponding one of the corresponding dimensions of the allocated display area.

12. The system according to claim 10, where the computer program data comprises a set of data and the scroll bar manager further comprises a user interface control component configured to:
    request the set of data by the computer program; and
    determine a size of the requested set of data, where the size of the requested set of data comprises the total amount of the computer program data being retrieved.

13. The system according to claim 12, where, in being configured to determine the size of the requested set of data, the user interface control component is configured to:
    issue a structured query language (SQL) count query to a database;
    receive a number of rows of data available from the database in response to the SQL count query; and set the total amount of the computer program data being retrieved as the number of rows of data available from the database in response to the SQL count query.

14. A computer program product comprising a non-transitory computer useable storage medium having computer executable instructions thereon for carrying out the method of claim 5.

* * * * *